(12) United States Patent
Trott

(10) Patent No.: US 8,487,914 B2
(45) Date of Patent: Jul. 16, 2013

(54) OPTICAL FINGERPRINT NAVIGATION DEVICE WITH LIGHT GUIDE FILM

(75) Inventor: Gary R. Trott, San Mateo, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 591 days.

(21) Appl. No.: 12/487,359

(22) Filed: Jun. 18, 2009

(65) Prior Publication Data

US 2010/0322550 A1  Dec. 23, 2010

(51) Int. Cl.
*G06F 3/042* (2006.01)
*G02B 6/10* (2006.01)

(52) U.S. Cl.
USPC .......................................... 345/176; 385/130

(58) Field of Classification Search
USPC .... 345/173, 157, 176; 382/124, 127; 250/221
See application file for complete search history.

(56) References Cited

U.S. PATENT DOCUMENTS

| | | | |
|---|---|---|---|
| 4,484,179 A * | 11/1984 | Kasday | 345/176 |
| 6,011,860 A | 1/2000 | Fujieda et al. | |
| 6,872,931 B2 | 3/2005 | Liess et al. | |
| 6,933,064 B2 * | 8/2005 | Anderson et al. | 428/690 |
| 7,163,733 B2 * | 1/2007 | Bourdelais et al. | 428/172 |
| 7,177,451 B2 | 2/2007 | Higuchi | |
| 7,313,255 B2 | 12/2007 | Machida et al. | |
| 7,358,514 B2 | 4/2008 | Setlak et al. | |
| 8,077,162 B2 * | 12/2011 | Endo | 345/177 |
| 2004/0208348 A1 * | 10/2004 | Baharav et al. | 382/124 |
| 2005/0036083 A1 | 2/2005 | Hayashi et al. | |
| 2006/0028442 A1 | 2/2006 | Bynum et al. | |
| 2007/0125937 A1 * | 6/2007 | Eliasson et al. | 250/221 |
| 2007/0215793 A1 * | 9/2007 | Gruhlke et al. | 250/221 |
| 2008/0049989 A1 | 2/2008 | Iseri et al. | |
| 2009/0267919 A1 * | 10/2009 | Chao et al. | 345/175 |

FOREIGN PATENT DOCUMENTS

| | | |
|---|---|---|
| CN | 1487399 | 4/2004 |
| WO | WO-2009-020940 | 2/2009 |

\* cited by examiner

*Primary Examiner* — Ryan Lepisto
*Assistant Examiner* — Erin Chiem

(57) ABSTRACT

An optical finger navigation device. Embodiments of the optical finger navigation device include a light guide film (LGF) including a finger interface surface, a light source in optical communication with the LGF to provide light from the light source to the finger interface surface, a sensor, and a navigation engine. At least a portion of the LGF exhibits total internal reflection (TIR). The sensor detects light from the LGF in response to contact between a finger and the finger interface surface which modifies reflection of light out of the LGF to the sensor. The light detected by the sensor is changed over at least a portion of the sensor in response to the contact between the finger and the finger interface surface. The navigation engine is configured to generate lateral movement information indicative of lateral movement of the finger relative to the sensor, in response to the detected light.

9 Claims, 8 Drawing Sheets

OPTICAL FINGERPRINT NAVIGATION DEVICE WITH LIGHT GUIDE FILM

BACKGROUND

Optical navigation devices use a light source to illuminate a navigation surface so that an optical imager can generate digital images for computing motion. For example, an optical imager can image a finger on a surface and generate a navigation signal based on comparisons of sequential images. However, as the size of conventional navigation devices is reduced, the physical space for the imager for detecting the optical navigation input are also reduced.

Some conventional optical navigation device packages have a thickness, or optical height, of about 2.5 mm. The optical height refers to the distance from an optical finger interface surface to a corresponding sensor. The optical height is also referred to as the optical track. An optical track, or thickness, of 2.5 mm is considered too thick for some implementations of handheld devices such as cellular telephones and small portable personal computing (PC) peripherals.

Many optical navigation devices use a discrete element called a light guide to channel light from the light source to the navigation surface. Light from the light source travels through the light guide until it intersects with a boundary of the light guide. When the light intersects with the boundary of the light guide, it either partially exits the light guide and partially reflects within the light guide, or completely reflects off the boundary of the light guide, traveling in a new direction within the light guide. This type of reflection is called "total internal reflection" (TIR), and is dependent upon the angle of incidence of the light with the boundary and the refractive indices of the light guide and the material outside the light guide. The light guide is typically a molded piece of clear plastic, and the thickness of the light guide element directly adds to the overall thickness of the optical navigation device.

SUMMARY

Embodiments of a finger navigation device are described. In one embodiment, the finger navigation device includes a light guide film (LGF), a light source, a sensor, and a navigation engine. The LGF includes a finger interface surface, and at least a portion of the LGF exhibits total internal reflection (TIR). The light source is in optical communication with the LGF to provide light from the light source to the finger interface surface. The sensor is configured to detect light from the LGF and other sources in response to contact between a finger and the finger interface surface. Due to the small geometry, or external conditions, there may be no light from other sources. Hence the need for the LGF film. Contact between the finger and the finger interface surface modifies reflection of light out of the LGF to the sensor. The light detected by the sensor is changed over at least a portion of the sensor in response to the contact between the finger and the motion of the finger interface surface. The navigation engine is configured to generate lateral movement information, which is indicative of lateral movement of the finger relative to the sensor, in response to modification to detected light. Other embodiments of the finger navigation device are also described.

Embodiments of a method are also described. In one embodiment, the method is a method manufacture for a finger navigation device. The method includes forming a plurality of non-planar elements on a finger interface surface of a light guide film (LGF), coupling the LGF to a sensor, and coupling a light source in optical communication with the LGF. The non-planar elements at least partially protrude beyond a substantially planar major surface of the LGF. At least a portion of the LGF exhibits total internal reflection (TIR). The sensor is configured to detect a change in a pattern of light from the LGF in response to contact and motion between a finger and the finger interface surface. The contact between the finger and the finger interface surface modifies the TIR to allow a portion of the light from the LGF over at least a portion of the finger interface surface to escape from the LGF and interact with the finger response function. At least some of the light escapes from the LGF, interacts with the finger, and modifies a pattern of light reaching the sensor. The light source provides light through the LGF to the finger interface surface. Other embodiments of the method are also described.

Embodiments of a system are also described. In one embodiment, the system is a portable electronic system with optical finger navigation. The system includes a display including a navigation indicator, a light guide film (LGF) including a finger interface surface, a light source in optical communication with the LGF, and an optical finger navigation device. At least a portion of the LGF exhibits total internal reflection (TIR). The light source provides light to the finger interface surface through the LGF. The optical finger navigation device is configured to generate a navigation signal to move the navigation indicator based on a change in a detected light pattern according to contact between a finger and the finger interface surface. Contact between the finger and the finger interface surface modifies reflection of light out of the LGF to the sensor, changing the light detected by the sensor over at least a portion of the sensor. Other embodiments of the system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

A film is used as a light guide in some embodiments. The light guide film (LGF) is thinner than a traditional light guide, and as a result, a thinner optical finger navigation device may be produced using an LGF. Additionally, in some embodiments, the LGF includes non-planar elements that enhance the scattered light from the LGF. The non-planar elements interact with a finger to modify the scattering of the light. The geometry of the non-planar elements increases the amount of light that escapes the LGF; as a result, the image detected by a sensor is more intense and easier to detect. Consequently, the amount of light fed to the LGF can be reduced and battery power can be conserved. A sensor detects the modified scattering of light.

Figure 1:
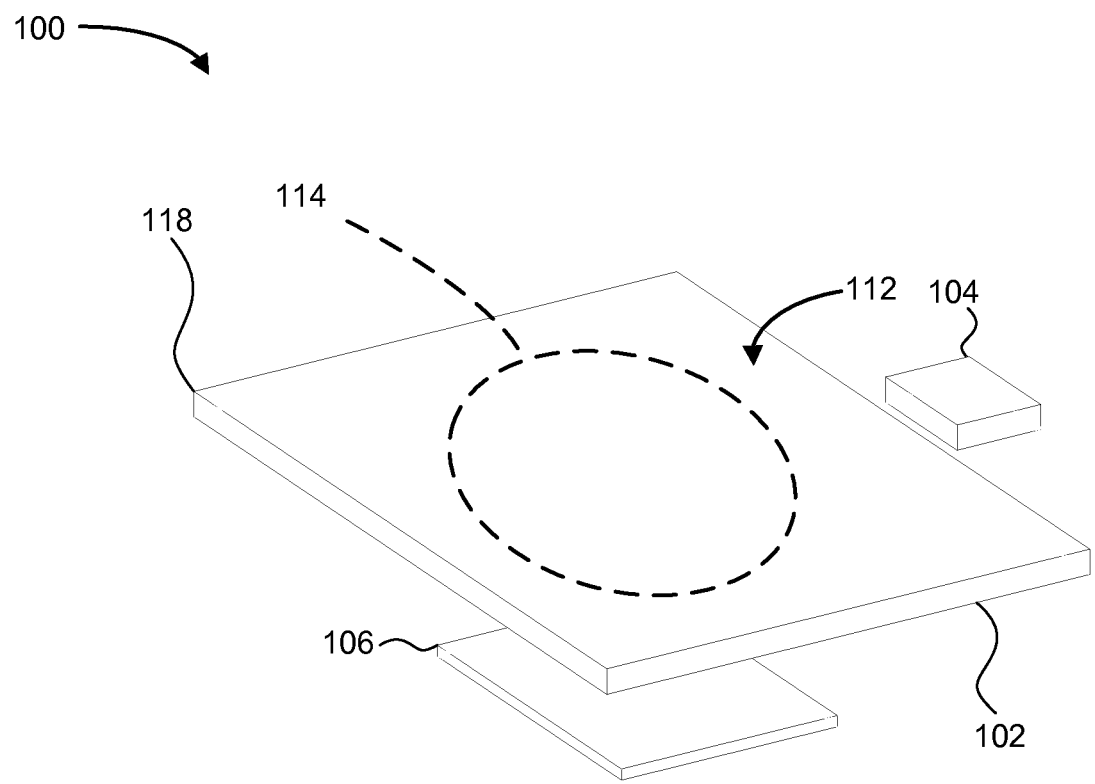
FIG. 1 depicts a perspective view of one embodiment of a user input device in the form of an optical finger navigation device.

FIG. 1 depicts a perspective view of one embodiment of a user input device in the form of an optical finger navigation device 100. The optical finger navigation device 100 includes a light guide film (LGF) 102, one or more light source(s) 104, and a sensor 106. Although the optical finger navigation device 100 is shown and described with certain components and functionality, other embodiments may be implemented with fewer or more components to facilitate less or more functionality.

In some embodiments, the LGF 102 is constructed of a light transmissive material film. The LGF 102 is flexible in certain embodiments, and may be curved when installed into an electronic device to facilitate mechanical placement of the components in space available positions. The LGF 102 may be bent and still maintain desired optical properties due to total internal reflection (TIR) of the light generated at the light source 104. In other embodiments, the LGF 102 is substantially planar. Even though the LGF 102 may have a curved geometry, the optical characteristics of the LGF 102 are nevertheless similar to a planar geometry with respect to the TIR of the light within the LGF 102. In some embodiments, the LGF 102 may have a polished surface to further facilitate the TIR. Additionally, a reflective coating may be applied to the surface of the LGF 102.

The LGF 102, in some embodiments, is generally substantially thinner than a traditional light guide. Traditional light guides are typically on the order of several millimeters thick. In a traditional thick light guide, the rays undergo a minimum number of reflections from interfaces before the light exits the thick light guide. In contrast, in the thin film type light guide there is a high number of internal reflections from the interfaces. Hence the interaction with the finger in contact is greatly increased. The LGF 102, in one embodiment, is between about 30 and about 100 microns thick.

The LGF 102 is formed using thin film plastic manufacturing techniques, such as deposition, cast film extrusion, or embossing, in certain embodiments, which results in a thinner product than can be produced using the techniques used to form traditional light guides, such as injection molding. Since the LGF 102 is substantially thinner than a traditional light guide and provides efficient, high brightness area illumination, the overall thickness of the optical finger navigation device 100 is reduced.

The LGF 102 includes a major surface 112. In the illustrated embodiment, the major surface 112 is the top surface of the LGF 102. As depicted, the major surface 112 includes a portion that is substantially planar. The major surface 112 also may include the top surface of a curved portion of an LGF 102.

The LGF 102 also includes a finger interface surface 114. More specifically, a portion of the major surface 112 is designated as the finger interface surface 114. The finger interface surface 114 is generally the portion of the major surface 112 at which a finger (not shown) contacts the LGF 102. In some embodiments, the finger interface surface 114 is circular. Alternatively, the finger interface surface 114 is non-circular.

The finger interface surface 114 facilitates user contact with the LGF 102. Contact of, for example, a user's finger with the finger interface surface 114 causes light that would otherwise be reflected by TIR to at least partially exit the light guide where the finger contacts the LGF 102. Some of the light that exits the LGF reflects off of the finger and is directed back to the sensor 106. The sensor 106 detects a change in light intensity as a result of this reflected light. In some embodiments, non-planar elements (not shown) enhance the amount of light scattered from a finger by increasing the amount of light that exits the LGF 102 at the finger interface surface 114. Non-planar elements are described in greater detail in relation to FIGS. 4A, 4B, and 5. Since the finger contact may be monitored and finger movements may be calculated, the finger contact with the finger interface surface 114 facilitates a user input at the LGF 102.

Figure 2A:
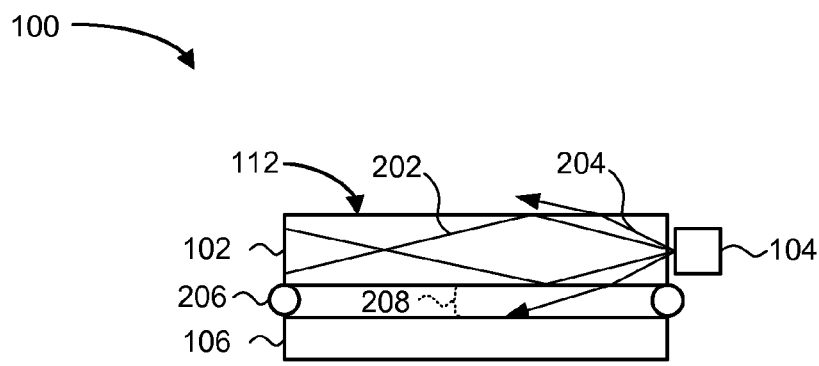
FIG. 2A depicts a cross-sectional diagram of one embodiment of the optical finger navigation device of FIG. 1.

FIG. 2A depicts a cross-sectional diagram of one embodiment of the optical finger navigation device 100 of FIG. 1. The optical finger navigation device 100 includes the LGF 102, the light source 104, the sensor 106, and one or more spacers 206. The LGF 102 includes the major surface 112. The light source 104 directs light into the LGF 102. The LGF 102 reflects the light internally through TIR depending on the angle of incidence of the light and the relative indices of refraction of material on either side of a boundary of the LGF 102. A low angle ray of light 202 and a high angle ray of light 204 are also depicted. "Low" and "high" as used in relation to angles of light in this document refer to the relative angle of the rays of light from the surface of the LGF 102, rather than an angle from the normal of the surface of the LGF 102.

In some embodiments, a low angle ray of light 202 is totally internally reflected as it encounters a boundary between the LGF 102 and the surrounding environment. A high angle ray of light 204, however, may escape from the LGF 102 at the boundary between the LGF 102 and the surrounding environment. The high angle ray of light 204 may be detected by the sensor 106 and/or interact with a finger.

The spacer 206, in one embodiment, is located between the LGF 102 and the sensor 106. The spacer 206 holds the sensor 106 a fixed distance from the LGF 102. By maintaining a separation between the sensor 106 and the LGF 102, the spacer creates a gap 208. The gap 208 may contain the fluid found in the surrounding environment, such as air, or may contain a separate fluid, such as an inert gas. In some environments, the gap 208 maintains a vacuum or a relatively low density fluid. In certain embodiments, the spacer 206 is one or more spherical elements.

Figure 2B:
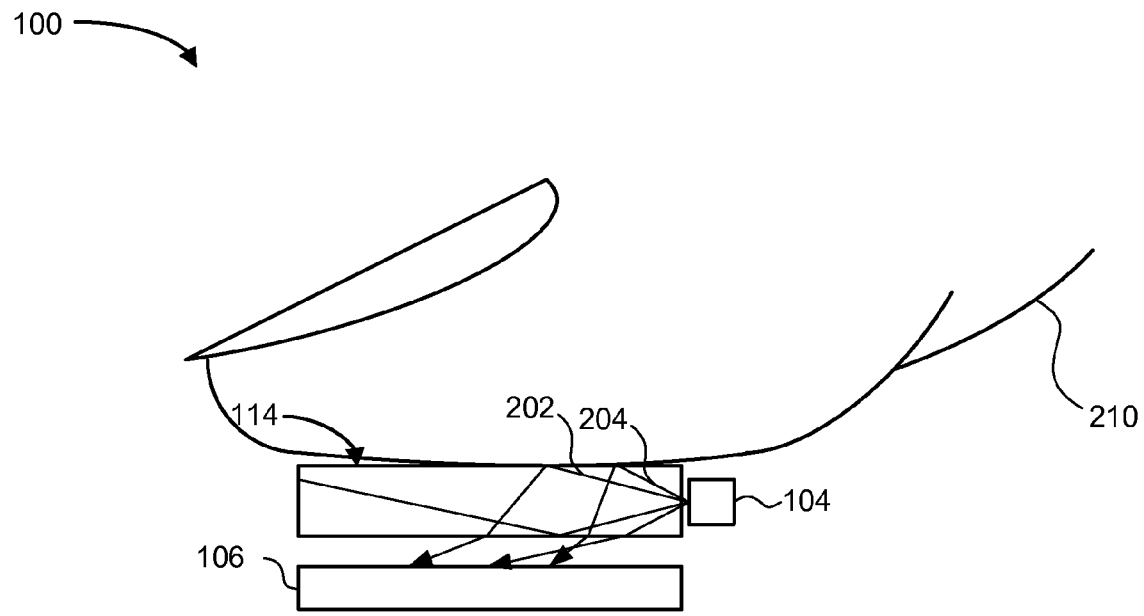
FIG. 2B depicts a cross-sectional diagram of one embodiment of the optical finger navigation device of FIG. 1 with a finger positioned relative to a light guide film (LGF) to modify the total internal reflection of the LGF.

FIG. 2B depicts a cross-sectional diagram of one embodiment of the optical finger navigation device 100 of FIG. 1 with a finger 210 positioned relative to the LGF 102 to modify the TIR of the LGF 102. In the illustrated embodiment, the finger 210 physically contacts the finger interface surface 114 of the LGF 102 and modifies the TIR of the light reflected within the LGF 102. The physical contact between the finger 210 and the LGF 102 modifies the TIR and at least partially scatters light out of the LGF 102 The change in the surface function due to the refractive index change from LGF 102 to the surrounding environment to LGF 102 to finger results in a change in the optical function (scattering and absorption) which is detected by the imagers. In some embodiments, the finger 210 has an index of refraction relatively closer to the index of refraction of the LGF 102 than that of air. As a result, a low angle ray of light 202, which would totally internally reflect off of the LGF-environment boundary, is instead at least partially scattered by the finger 210, changing the light pattern detected by the sensor 106. Furthermore, the high angle ray of light 204, which would escape to the environment in a direction away from the sensor 106 in the absence of the finger 210, may be reflected by the finger toward the sensor 106, changing the light pattern detected by the sensor 106. In certain embodiments, light reflects off the finger 210 and reaches the sensor 106 that would not otherwise reach the sensor 106. Light reflected off the finger 210 to the sensor 106 changes the light pattern detected by the sensor 106

Figure 3A:
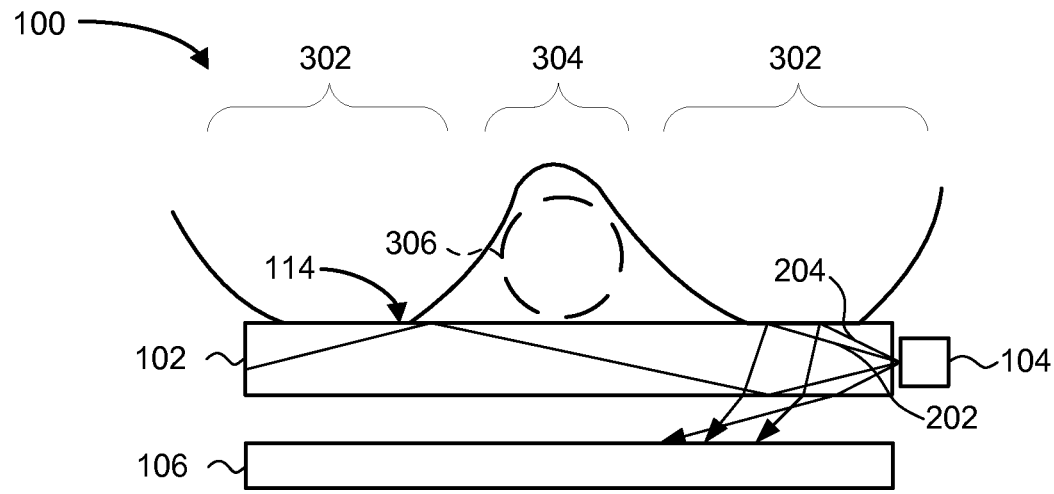
FIG. 3A depicts a cross-sectional diagram of one embodiment of the optical finger navigation device of FIG. 1 with fingerprint ridges and a fingerprint valley positioned relative to the LGF to modify the total internal reflection of the LGF.

FIG. 3A through FIG. 5 depict magnified views of cross sections of embodiments of the optical finger navigation device 100 of FIG. 1. FIG. 3A depicts a cross-sectional diagram of one embodiment of the optical finger navigation device 100 of FIG. 1 with fingerprint ridges 302 and a fingerprint valley 304 positioned relative to the LGF 102 to modify the TIR of the LGF 102. A finger 210 includes a plurality of fingerprint ridges 302. Between the fingerprint ridges 302 are fingerprint valleys 304. In certain embodiments, when the finger 210 contacts the finger interface surface 114, the fingerprint ridges 302 are in direct contact with the finger interface surface 114, while small pockets of air 306 are left at the fingerprint valleys 304.

TIR is dependent on relative indices of refraction and angles of incidence, as described above. A high angle ray of light 204, in one embodiment, may be at least partially reflected by a fingerprint ridge 302 if the fingerprint ridge 302 is in contact with the finger interface surface 114 where the high angle ray of light 204 encounters the finger interface surface 114. As a result, the image detected by the sensor 106 is modified by the contact with the fingerprint ridge 302.

A low angle ray of light 202, which would be totally internally reflected at the finger interface surface 114 if the finger was absent, may be scattered if the low angle ray of light 202 encounters the finger interface surface where a fingerprint ridge 302 is located. The scattered light from the low angle ray of light 202 may be scattered toward the sensor 106 and modify the image detected by the sensor 106.

Figure 3B:
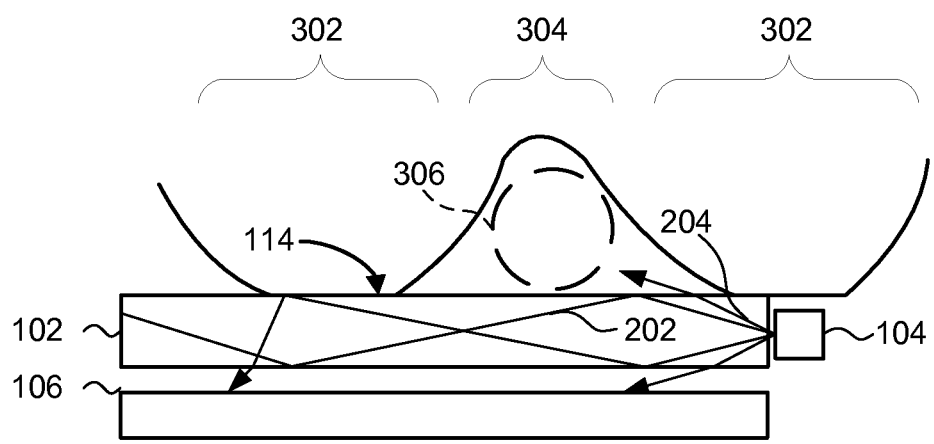
FIG. 3B is another cross-sectional diagram of one embodiment of the optical finger navigation device of FIG. 1 with fingerprint ridges and a fingerprint valley positioned in another position relative to the LGF to modify the total internal reflection of the LGF.

FIG. 3B is another cross-sectional diagram of one embodiment of the optical finger navigation device 100 of FIG. 1 with fingerprint ridges 302 and a fingerprint valley 304 positioned in another position relative to the LGF 102 to modify the TIR of the LGF 102. In the illustrated embodiment, the high angle ray of light 204 intersects the finger interface surface 114 where a fingerprint valley 304 is over the finger interface surface 114. Consequently, the high angle ray of light 204 may at least partially escape from the LGF 102.

Similarly, the low angle ray of light 202 intersects the finger interface surface 114 where a fingerprint valley 304 is over the finger interface surface 114. Consequently, the low angle ray of light 202 exhibits TIR at the finger interface surface 114. The change in fingerprint position results in a change in the pattern of TIR of the collective ensemble of rays of light 202, 204. The change in pattern is detected by the sensor 106.

In some embodiments, as a finger 210 moves over the finger interface surface 114, the type and amount of reflection of a high angle ray of light 204 and scattering of low angle ray of light 202 at the finger interface surface 114 may change. When the finger 210 is situated such that a fingerprint ridge 302 is located at the intersection of the high angle ray of light 204 and the finger interface surface (as illustrated in FIG. 3A), the high angle ray of light 204 is at least partially scattered by the fingerprint ridge 302. Similarly, when the finger 210 is situated such that a fingerprint ridge 302 is located at the intersection of the low angle ray of light 202 and the finger interface surface (as illustrated in FIG. 3A), the low angle ray of light 202 is at least partially scattered by the fingerprint ridge 302. When the finger 210 is situated such that a fingerprint valley 304 is located at the intersection of the high angle ray of light 204 and the finger interface surface (as illustrated in FIG. 3B), the high angle ray of light 204 may at least partially escape from the LGF 102. When the finger 210 is situated such that a fingerprint valley 304 is located at the intersection of the low angle ray of light 202 and the finger interface surface (as illustrated in FIG. 3B), the low angle ray of light 202 exhibits TIR. The sensor 106 detects this change as more or less light from the high angle ray of light 204 and the low angle ray of light 202 reaches a location on the sensor 106 as the position of the finger 210 changes.

Figure 4A:
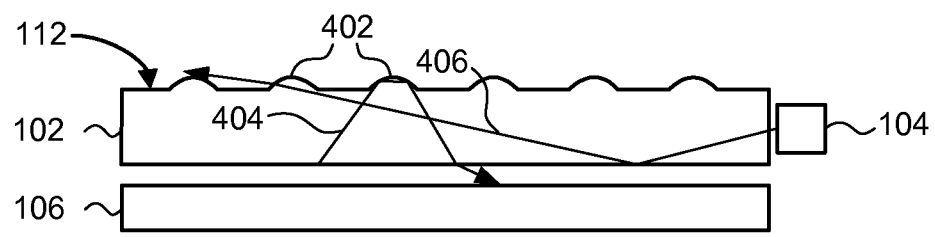
FIG. 4A depicts a cross-sectional diagram of another embodiment of the optical finger navigation device of FIG. 1, which includes non-planar elements on a major surface of the LGF.

FIG. 4A depicts a cross-sectional diagram of another embodiment of the optical finger navigation device 100 of FIG. 1, which includes non-planar elements 402 on the major surface 112 of the LGF 102. The non-planar elements 402, in one embodiment, are out of plane with the major surface 112. In one embodiment, the non-planar elements 402 are distributed uniformly across the finger interface surface 114. In an alternative embodiment, the non-planar elements 402 are distributed non-uniformly across the finger interface surface 114. In certain embodiments, the non-planar elements 402 at least partially protrude beyond the major surface 112. In one embodiment, the non-planar elements 402 comprise bumps on the finger interface surface 114. In an alternative embodiment, the non-planar elements 402 are depressions. The non-planar elements result in differing angles of incidence for light rays within the LGF 102. The differing angles of incidence result in scattering rays of light that would otherwise be totally internally reflected.

The non-planar elements 402 modify the TIR of the LGF 102 and scatter light from the light source 104. In one embodiment, the non-planar elements 402 scatter the light from the light source 104 such that at least some light is directed into the sensor 106. In some embodiments, the non-planar elements 402 scatter the light from the light source 104 such that at least some of the light is directed away from the sensor 106. For example, a low angle ray of light 406 which would be totally internally reflected by the major surface 112 may at least partially exit the LGF 102 in a direction away from the sensor 106 when the light impacts a non-planar element 402. Light scattered away from the sensor 106 by the non-planar elements 402 may serve to illuminate the finger interface surface 114. The light scattered away from the sensor 106 by the non-planar elements 402 may also interact with a finger 210 and be reflected back to the sensor 106. The effect of these interactions caused by the non-planar elements 402 is to increase the signal detected by the sensor 106.

The sensor 106, in one embodiment, generates an image from the light directed into the sensor 106. Light scattered by the non-planar elements 402 toward the sensor 106 is represented in the static image generated by the sensor 106. In certain embodiments, changes to the images generated by the sensor 106 are interpreted as movement by a finger 210 on the finger interface surface 114.

The action of the non-planar elements 402 is to increase the brightness and complexity of the scattering and absorption of the finger ridges and valleys over the sensor 106 versus a planar TIR waveguide with no non-planar elements. This increase in brightness enhances the ability to detect motion. Non-planar elements have a high to low (e.g., LGF-to-air) index change. In one embodiment, air bubbles or nanospheres may be induced into the area 114 of the LGF film with a high index change as another means to increase the local static scattering. However, bumps may be preferred in some embodiments because the bumps change the most in response to a finger.

Figure 4B:
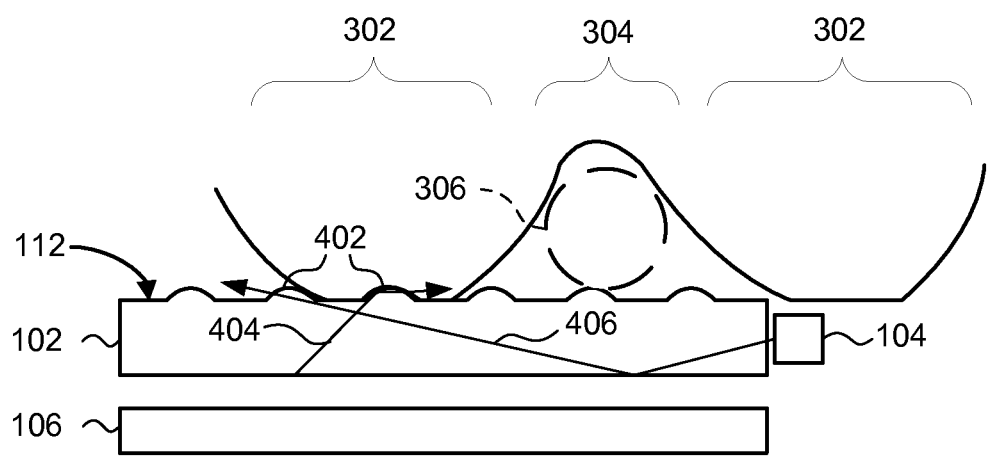
FIG. 4B depicts the cross-sectional diagram of FIG. 4A relative to fingerprint ridges and a fingerprint valley of a finger.

FIG. 4B depicts the cross-sectional diagram of FIG. 4A relative to fingerprint ridges 302 and a fingerprint valley 304 of a finger. In certain embodiments, when the finger 210 contacts the finger interface surface 114, the fingerprint ridges 302 are in direct contact with one or more non-planar elements 402, while small pockets of air are left at the fingerprint valleys 304. Fingerprint ridges 302 in contact with non-planar elements 402 modify the internal reflection of light within the LGF 102. For example, the high angle ray of light 404 that impacts non-planar element 402 is totally internally reflected when air is adjacent to the non-planar element 402 as is the case in FIG. 4A. If, instead, a fingerprint ridge 302 is adjacent to the non-planar element 402 as is the case in FIG. 4B, the high angle ray of light 404 at least partially exits the LGF 102. This change in internal reflection is due at least in part to a difference between the indices of refraction of air and the fingerprint ridge 302. The change in the internal reflection of a particular ray of light modifies the light entering the sensor 106. Consequently, the image generated by the sensor 106 also changes. The optical finger navigation device 100, in one embodiment, interprets the changes in generated images as movement by a finger 210 across the finger interface surface 114.

Figure 5:
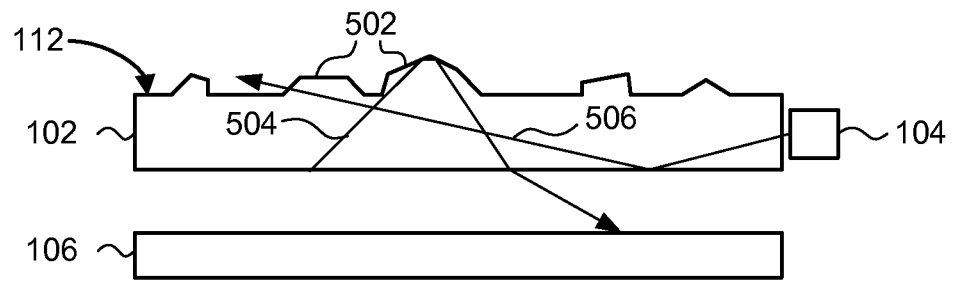
FIG. 5 depicts a cross-sectional diagram of another embodiment of the optical finger navigation device of FIG. 1 including irregular non-planar elements.

FIG. 5 depicts a cross-sectional diagram of another embodiment of the optical finger navigation device 100 of FIG. 1 including prism shapes or irregular non-planar elements 502. The irregular non-planar elements 502 may take any shape. In some embodiments, the irregular non-planar elements 502 may appear to be random shapes. For example, the irregular non-planar elements 502 may be an arbitrary texture formed on the finger interface surface 114. The irregular non-planar elements 502 are uniformly distributed across the finger interface surface 114. In another embodiment, the irregular non-planar elements 502 are not distributed uniformly across the finger interface surface 114. In some embodiments, the irregular non-planar elements 502 may consist of environmental elements, such as dust or oil on the surface of the finger interface surface 114.

The irregular non-planar elements 502 modify the internal reflection of light within the LGF 102. The irregular non-planar elements 502, in some embodiments, scatter at least some light out of the LGF 102. Light scattered toward the sensor 106 is detected by the sensor 106. Light scattered away from the sensor 106 may illuminate the finger interface surface 114 and may interact with a finger 210.

The irregular non-planar elements 502, in one embodiment, interact with fingerprint ridges 302 and fingerprint valleys 304 in a similar manner to the other non-planar elements 402 as described above in relation to FIG. 4B. For example, a fingerprint ridge 302 in contact with an irregular non-planar element 502 may absorb at least some light that would otherwise be scattered toward the sensor 106, resulting in a change to the light detected by the sensor 106.

Figure 6:
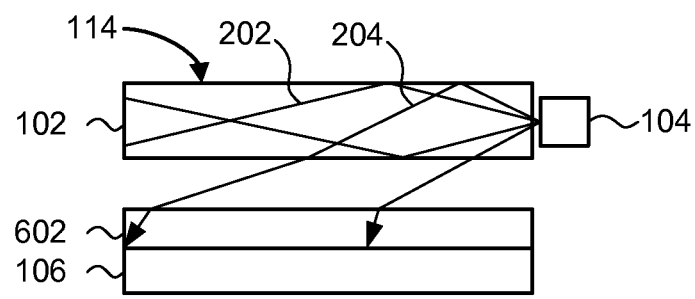
FIG. 6 depicts a cross-sectional diagram of another embodiment of the optical finger navigation device of FIG. 1 including an encapsulant.

FIG. 6 depicts a cross-sectional diagram of another embodiment of the optical finger navigation device 100 of FIG. 1 including an encapsulant 602. The encapsulant 602, in one embodiment, covers the sensor 106 and provides protection to the sensor 106. In certain embodiments, the encapsulant 602 is a light transmissive material allowing light from the LGF 102 to pass through the encapsulant 602 to the sensor 106. In certain embodiments, the encapsulant 602 is formed with optical characteristics that allow it to act as a lens. The lens formed by the encapsulant 602 may be a refractive element or a Fresnel lens. In another embodiment, the encapsulant 602 is attached to the bottom of the LGF 102, rather than to the top of the sensor 106. In particular, the encapsulant 602 may be aligned with the finger contact area 114. Thus, the exact location of the encapsulant 602 may vary from one embodiment to another, as long as there is an air gap (or another low-index layer such as aerogel) at some place in the stack up between the sensor 106 and the LGF 102.

Figure 7:
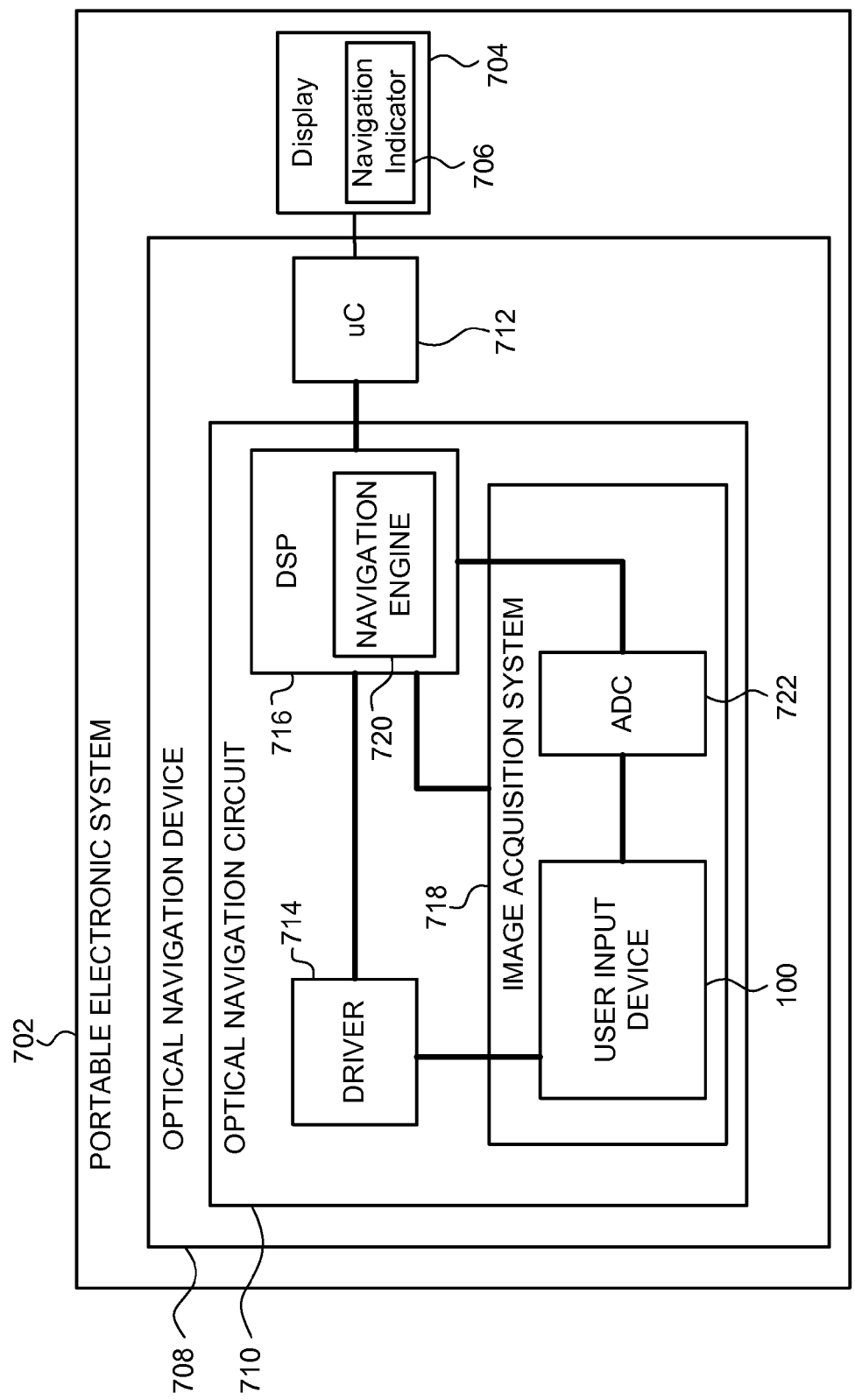
FIG. 7 depicts a block diagram of one embodiment of a portable electronic system with optical finger navigation.

FIG. 7 depicts a block diagram of one embodiment of a portable electronic system 702 with optical finger navigation. The portable electronic system 702 implements the user input device 100 (e.g., the optical finger navigation device 100 of FIG. 1) to facilitate user input. Examples of portable electronic systems 702 which may implement embodiments of the user input device 100 include handheld communications devices such as cellular telephones and global positioning system (GPS) devices. Additionally, other types of electronic peripherals such as personal music players, personal digital assistants (PDAs), bio-metric finger print sensors, and so forth may be implemented within embodiments of the portable electronic system 702.

By implementing an embodiment of the user input device 100 in the portable electronic system 702, the user input device 100 may facilitate, for example, user input to navigate content on a display device 141 of the user input device 100. For example, the user input device 100 may facilitate control of a navigation indicator 706 on the display device 704. The navigation indicator 706 may be a cursor, a highlighter, an arrow, or another type of navigation indicator. Additionally, the user input received through the user input device 100 may facilitate other types of user-controlled functionality including, but not limited to, volume controls, audio playback selections, browser controls, bio-metric identification, electronic musical instruments, actions in games, and so forth. The types of user-controlled functionality that may be implemented with embodiments of the user input device 100 may depend on the type of functionality generally provided by the portable electronic system 702. Also, although FIG. 7 specifically illustrates a portable electronic system 702, other embodiments may implement the user input device 100 in electronic devices which are portable, but not necessarily held in a user's hand, or devices which are generally considered to be not portable.

The portable electronic system 702 includes an optical navigation device 708. Although the optical navigation device 708 is shown with certain components and described herein as implementing certain functionality, other embodiments of the optical navigation device 708 may include fewer or more components to implement less or more functionality.

The illustrated optical navigation device 708 includes an optical navigation circuit 710 and a microcontroller (uC) 712. In general, the optical navigation circuit 710 generates signals representative of finger or other navigation movement at the user input device 100. The optical navigation circuit 710 then transmits one or more signals to the microcontroller 712. Exemplary types of signals transmitted from the optical navigation circuit 710 to the microcontroller 712 include channel quadrature signals based on ΔX and ΔY relative displacement values. The ΔX and ΔY displacement values may represent a specific pattern for finger print identification or a vector of displacement, direction, and magnitude. These signals, or other signals, may be indicative of a relative movement between the finger and the user input device 100. Other embodiments of the optical navigation circuit 710 may transmit other types of signals to the microcontroller 712. In some embodiments, the micro controller 712 implements a variety of functions, including transmitting data to and receiving data from a host computer system or other electronic device (not shown) or acting on the displacement values.

In order to generate the navigation signals, the depicted optical navigation circuit 710 includes a driver 714, a digital signal processor (DSP) 716, and an image acquisition system (IAS) 718. The image acquisition system 718 includes the user input device 100 and an analog-to-digital converter (ADC) 722. Other embodiments of the optical navigation circuit 710 and or the image acquisition system 718 may include fewer or more components to implement less or more functionality.

In one embodiment, the driver 714 of the optical navigation circuit 710 controls the operation of the light source 104 to generate the light signal that is transmitted to the finger interface surface 114. The driver 714 may control the light source 104 to several different brightness levels, or the driver 714 may pulse the light source 104 in conjunction with sending detector on/off signals to the sensor 106, thereby increasing the system response function for desirable goals. The reflected light signal is then received and detected by the sensor 106 of the user input device 100, as described above.

In one embodiment, the user input device 100 generates one or more analog electrical signals corresponding to incident light on the sensor 106. The user input device 100 then transmits the analog signals to the analog-to-digital converter 722. The analog-to-digital converter 722 converts the electrical signals from analog signals to digital signals and then passes the digital signals to the digital signal processor 716.

After the digital signal processor 716 receives the digital form of the signals from the analog-to-digital converter 722 of the image acquisition system 718, the digital signal processor 716 may perform additional processing using the electrical signals. The digital signal processor 716 then transmits one or more signals to the microcontroller 712, as described above. In some embodiments, the digital signal processor 716 includes a navigation engine 720 to generate lateral movement information based on lateral movement of the finger relative to the finger interface surface 114. Other embodiments of the navigation engine 720 may generate other types of movement information.

More specifically, in one embodiment, the sensor 106 of the user input device 100 includes an array of distinct photodetectors (not shown), for example, a 16×16 or 32×32 array of distinct photodetectors configured to detect light that is reflected from the illuminated spot on the finger interface surface 114. Each of the photodetectors in the sensor 106 generates light intensity information that is output as a digital value (e.g., an 8-bit digital value). Image information is captured by the sensor 106 in frames, where a frame of image information includes a set of simultaneously captured values for each distinct photodetector in the sensor 106. The rate of image frame capture and tracking resolution can be programmable. In an embodiment, the image frame capture rate ranges up to 2,300 frames per second with a resolution of 800 counts per inch (CPI). Although some examples of frame capture rates and resolutions are provided, different frame capture rates and resolutions are contemplated.

The navigation engine 720 compares successive image frames from the sensor 106 to determine the movement of image features between frames. In particular, the navigation engine 720 determines movement by correlating common features that exist in successive image frames from the sensor 106. The movement between image frames is expressed in terms of movement vectors in, for example, X and Y directions (e.g., ΔX and ΔY). The movement vectors are then used to determine the movement of the input device 100 relative to the navigation surface. More detailed descriptions of examples of navigation sensor movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein.

Figure 8:
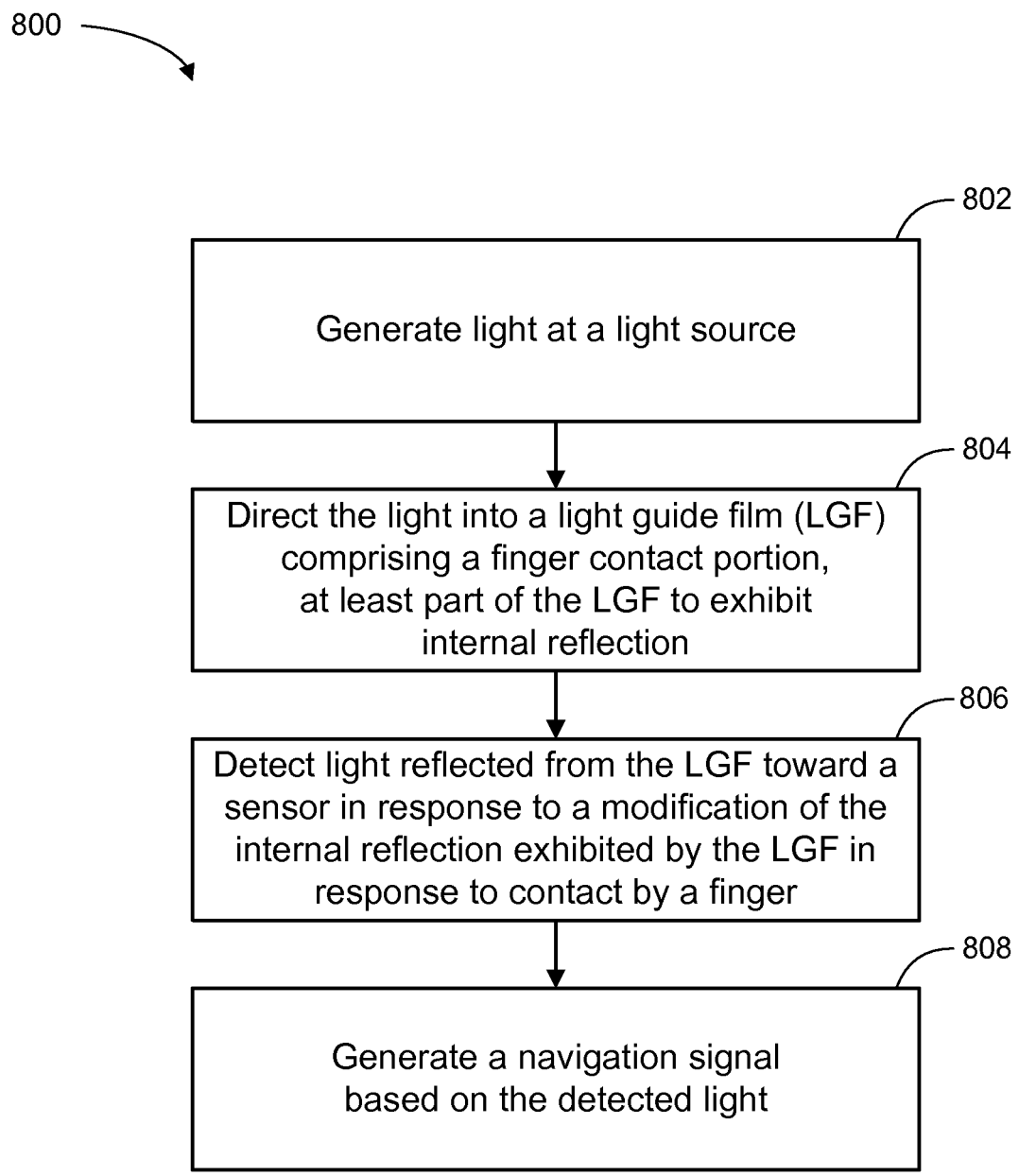
FIG. 8 is a flow chart diagram depicting one embodiment of a method for optical finger navigation using an LGF.

FIG. 8 is a flow chart diagram depicting one embodiment of a method 800 for optical finger navigation using an LGF. Although specific reference is made to the optical finger navigation device 100, some embodiments of the method 800 may be implemented in conjunction with other optical finger navigation systems or user input devices.

At block 802, the light source 104 generates light. The light source 104 may be a light-emitting diode (LED) or a laser, although many other types of light sources may be implemented. At block 804, the light illuminates the LGF 102, which has a finger interface surface 114, as described above. The LGF 102 at least partially exhibits TIR.

At block 806, the sensor 106 detects light reflected from the LGF 102 toward the sensor 106. The sensor 106 detects a different light pattern in response to a modification of the internal reflection exhibited by the LGF 102 in response to contact by a finger 210. In some embodiments, the sensor 106 detects modifications to the light pattern caused by the interaction of one or more fingerprint ridges 302 and fingerprint valleys 304 with the finger interface surface 114. In certain embodiments, the sensor 106 detects modifications the light pattern caused by interactions between one or more nonplanar elements 402 and the finger 210. At block 808, the sensor 106 generates a navigation signal based on the detected light.

Figure 9:
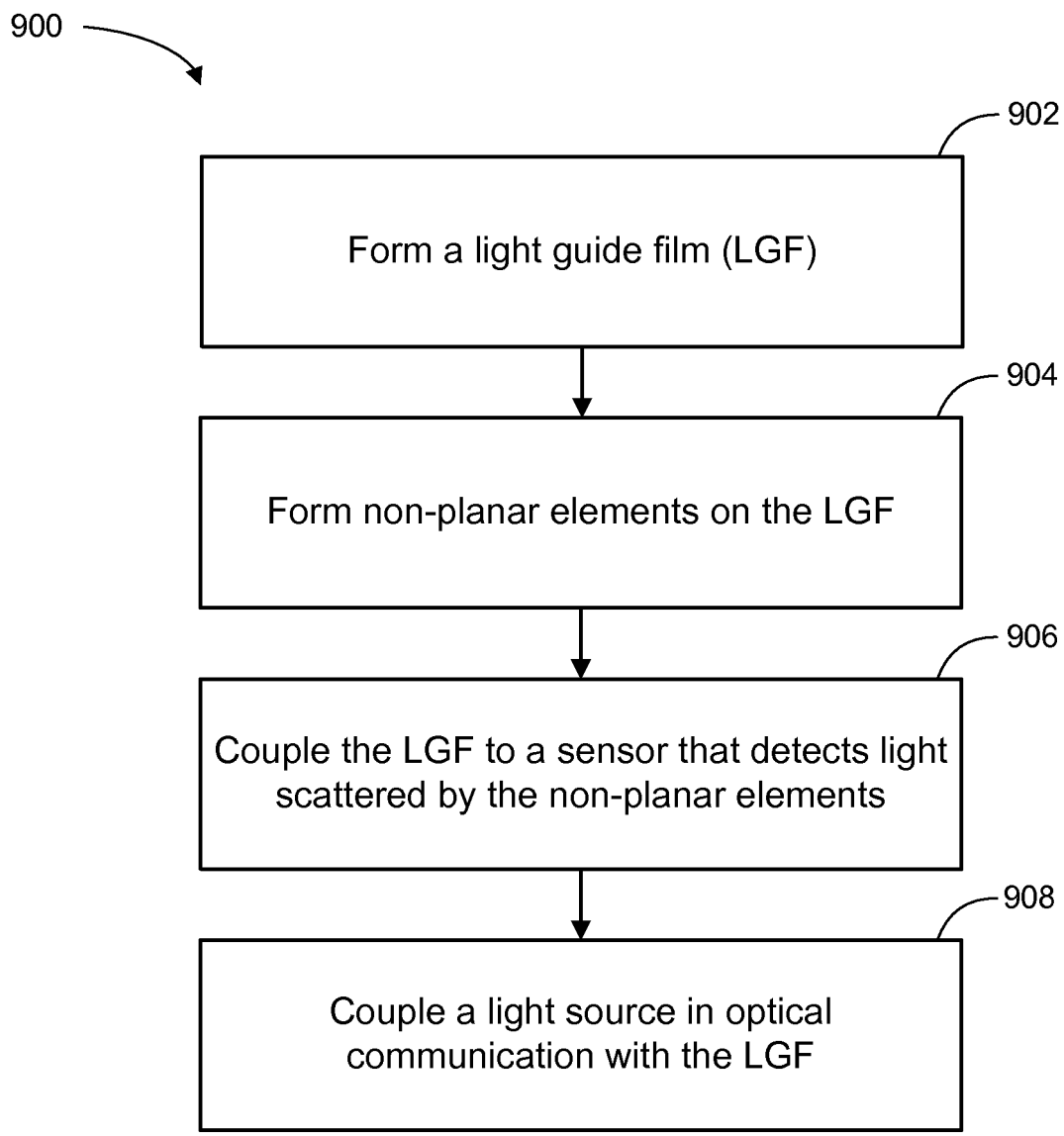
FIG. 9 is a flow chart diagram depicting one embodiment of a method for manufacturing an optical finger navigation device using an LGF.

FIG. 9 is a flow chart diagram depicting one embodiment of a method 900 for manufacturing an optical finger navigation device 100 using an LGF 102. Although specific reference is made to the optical finger navigation device 100, some embodiments of the method 900 may be implemented in conjunction with other optical finger navigation systems or user input devices.

At block 902, an LGF 102 is formed. The LGF 102 maybe formed using any process, including, but not limited to, roll to roll extrusion, physical deposition, chemical deposition, and melt spinning. The specific type of formation process used may depend on the intended functionality of the LGF 102. For example, the formation processes used to make an LGF for commercial lighting purposes may be different from the formation processes used to make an LGF for illuminating key labels in cell phones. At block 904, non-planar elements 402 are formed on the LGF 102. In some embodiments, the non-planar elements 402 at least partially protrude beyond a major surface 112 of the LGF 102. In an alternative embodiment, the non-planar elements 402 include depressions that extend below the major surface 112 of the LGF 102. The non-planar elements 402 may be formed using any method, including, but not limited to, embossing, layering, nano-imprinting, molding, etching, printing, bonding, and spraying. In some embodiments, the non-planar elements 402 can be incorporated into the bulk film in the finger area 114 provided the same optical function occurs as described with elements 402. For example, in some embodiments nanospheres (e.g., small air bubbles or sapphire spheres) may be formed within the LGF 102. A large change in index occurs between the nanosphere (not shown) and the LGF 102 such that an increased but static scattering of the light rays occurs. As a result, a finger will induce a change in the scattered intensity.

At block 906, the LGF 102 is coupled to a sensor 106 that detects light scattered by the non-planar elements 402. In one embodiment, the LGF 102 is coupled to the sensor 106 by bonding, for example, using a low index adhesive. In another embodiment, the LGF 102 is coupled to the sensor 106 with a low index encapsulant 602 between the LGF 102 and the sensor 106. In some embodiments, the LGF 102 is coupled to the sensor 106 through a spacer 206.

At block 908, a light source 104 is coupled in optical communication with the LGF 102. The light source 104 may be coupled with the LGF 102 in any way that allows light to travel from the light source 104 to enter the LGF 102.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical finger navigation device comprising
a light guide film (LGF) comprising a finger interface surface, wherein at least a portion of the LGF exhibits total internal reflection (TIR);
a light source in optical communication with the LGF to provide light from the light source to the finger interface surface, wherein the LGF further comprises a thin film between about 30 microns and about 100 microns thick that is configured for promoting number of internal light reflections and light interaction with a finger in contact with the finger interface surface;
a sensor configured to detect light from the LGF in response to contact between the finger and the finger interface surface, wherein the contact between the finger and the finger interface surface modifies reflection of light out of the LGF to the sensor over at least a portion of the sensor; and
a navigation engine configured to generate lateral movement information, which is indicative of lateral movement of the finger relative to the sensor, in response to the modification to the detected light.

2. The optical finger navigation device of claim 1, wherein the finger interface surface of the LGF comprises a major surface with a substantially planar portion and a plurality of non-planar elements at least partially out of plane with the substantially planar portion, wherein the non-planar elements modify the TIR to scatter the light from the light source out of the LGF.

3. The optical finger navigation device of claim 2, wherein the non-planar elements at least partially protrude beyond the substantially planar portion of the major surface.

4. The optical finger navigation device of claim 2, wherein the plurality of non-planar elements comprises bumps formed on the finger interface surface.

5. The optical finger navigation device of claim 2, wherein the plurality of non-planar elements comprises depressions formed on the finger interface surface.

6. The optical finger navigation device of claim 2, wherein the plurality of non-planar elements are uniformly distributed across the finger interface surface.

7. The optical finger navigation device of claim 1, wherein the light guide film comprises a plurality of nanospheres within the light guide film to increase static scattering of the light within the light guide film.

8. The optical finger navigation device of claim 2 wherein the non-planar elements scatter the light from the light source such that at least some of the light is directed away from the sensor.

9. The optical finger navigation device of claim 2, wherein the non-planar elements are configured to scatter the light from the light source to illuminate the finger interface surface.

* * * * *